(12) United States Patent
Kim et al.

(10) Patent No.: US 8,098,354 B2
(45) Date of Patent: Jan. 17, 2012

(54) LIQUID CRYSTAL DISPLAY

(75) Inventors: Hoon Kim, Ansan-si (KR); Dong-Gyu Kim, Yongin-si (KR); Kyeong-Hyeon Kim, Seongnam-si (KR); Jae-Jin Lyu, Yongin-si (KR); Jong-Ho Son, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 606 days.

(21) Appl. No.: 12/197,131

(22) Filed: Aug. 22, 2008

(65) Prior Publication Data

US 2009/0195737 A1 Aug. 6, 2009

(30) Foreign Application Priority Data

Jan. 31, 2008 (KR) ........................ 10-2008-0010205

(51) Int. Cl.
*G02F 1/1339* (2006.01)
(52) U.S. Cl. .......................... 349/129; 349/130; 349/110
(58) Field of Classification Search ......................... None
See application file for complete search history.

(56) References Cited

U.S. PATENT DOCUMENTS

| 6,424,398 | B1 | 7/2002 | Taniguchi | |
|---|---|---|---|---|
| 6,671,020 | B2 * | 12/2003 | Kim et al. | 349/129 |
| 6,738,120 | B1 * | 5/2004 | Song et al. | 349/139 |
| 6,930,740 | B2 * | 8/2005 | Yoon et al. | 349/129 |
| 7,812,909 | B2 * | 10/2010 | Cho et al. | 349/142 |
| 2003/0184698 | A1 * | 10/2003 | Ohta et al. | 349/139 |
| 2004/0169777 | A1 * | 9/2004 | Tanaka et al. | 349/39 |
| 2005/0179631 | A1 * | 8/2005 | Lyu | 345/87 |
| 2006/0087608 | A1 * | 4/2006 | Lee | 349/129 |
| 2006/0203166 | A1 | 9/2006 | Inoue et al. | |
| 2006/0209242 | A1 | 9/2006 | Sohn et al. | |
| 2009/0190058 | A1 * | 7/2009 | Jung et al. | 349/48 |

FOREIGN PATENT DOCUMENTS

| JP | 2002-162599 | 6/2000 |
|---|---|---|
| JP | 2003-043488 | 2/2003 |
| JP | 2005-084237 | 3/2005 |
| JP | 2006-201344 | 8/2006 |
| KR | 1020040008920 | 1/2004 |
| KR | 1020040107217 | 12/2004 |
| KR | 1020050079070 | 8/2005 |
| KR | 1020060099635 | 9/2006 |
| KR | 1020070025458 | 3/2007 |

OTHER PUBLICATIONS

English Abstract for Publication No. 2000-162599.
English Abstract for Publication No. 2003-043488.
English Abstract for Publication No. 1020040008920.
English Abstract for Publication No. 1020040107217.
English Abstract for Publication No. 2005-084237.
English Abstract for Publication No. 1020050079070.
English Abstract for Publication No. 2006-201344.
English Abstract for Publication No. 1020060099635.
English Abstract for Publication No. 1020070025458.

* cited by examiner

*Primary Examiner* — Thanh-Nhan Nguyen
(74) *Attorney, Agent, or Firm* — F. Chau & Associates, LLC

(57) ABSTRACT

In a vertical alignment liquid crystal display, a thin film transistor is formed on a first insulating substrate, and a pixel electrode (ITO) including cutouts (OPEN) is formed on the first substrate or a second substrate. A width of the cutouts of the upper and lower substrates gradually increases or decreases along a length thereof.

19 Claims, 15 Drawing Sheets

LIQUID CRYSTAL DISPLAY

CROSS-REFERENCE TO RELATED APPLICATION

This application claims priority to, and the benefit of, Korean Patent Application No. 10-2008-0010205 filed in the Korean Intellectual Property Office on Jan. 31, 2008, the entire contents of which are herein incorporated by reference.

BACKGROUND OF THE INVENTION (a) Field of the Invention

The present invention relates to a liquid crystal display. More particularly, the present invention relates to a liquid crystal display of a vertical alignment (VA) mode type in which the liquid crystal molecules are aligned vertically with respect to upper and lower panels.

(b) Description of the Related Art

Liquid crystal displays have been widely used as flat display devices. Liquid crystal displays typically include two display panels respectively provided with pixel electrodes and a common electrode, and a liquid crystal layer interposed between the two display panels. In the liquid crystal displays, an electric field is generated in the liquid crystal layer by applying a voltage to the pixel electrode and the common electrodes so as to control an alignment of liquid crystal molecules in the liquid crystal layer. Images are displayed by the liquid crystal displays by controlling polarization of incident light using the alignment of the liquid crystal molecules.

Among liquid crystal displays, a vertical alignment mode liquid crystal display (LCD) uses a vertical aligning agent and the liquid crystal molecules are aligned vertically with the upper and lower panels. The vertical alignment mode LCD may obtain a wide viewing angle and a fast response speed compared with a TN (twisted nematic) mode LCD.

In the vertical alignment (VA) mode LCD, as means for achieving a wide viewing angle, cutouts are formed in the field generating electrodes, and protrusions are formed on the field generating electrodes.

In the case of a patterned vertically aligned (PVA) mode LCD having cutouts, the pixels are divided into a plurality of domains by the cutouts of the field generating electrodes, and the liquid crystal molecules have different alignment directions in each domain. That is to say, the cutouts of the lower panel are disposed between the cutouts of the upper panel such that the electric field has a vertical component with the respect to the upper and lower cutouts, and domains having electric fields of different directions are respectively disposed on the upper portion and the lower portion in one pixel. The tilt directions of liquid crystal molecules are formed in four directions such that a reference viewing angle of the liquid crystal display is increased.

In the configuration of cutouts above, the intensity of the electric field is poor in a portion in which the cutouts of the field generating electrode are disposed, compared with the other portions. Accordingly, the liquid crystal molecules disposed in the portions corresponding to the cutouts are rearranged with a slower speed compared with the other liquid crystal molecules inside the domains such that image sticking may be instantly generated.

More particularly, singular points where the direction of the liquid crystal molecule are gathered into one position are not fixed inside the cutouts, and their positions continuously change while driving the liquid crystals, or the generation positions of the singular points are changed for every frame in which the signals of the pixels are changed such that the image sticking may be instantly generated.

The above information disclosed in this Background section is only for enhancement of understanding of the background of the invention and therefore it may contain information that does not form the prior art that is already known in this country to a person of ordinary skill in the art.

SUMMARY OF THE INVENTION

A liquid crystal display according to an exemplary embodiment of the present invention includes a first insulating substrate, gate wiring formed on the first insulating substrate, data wiring intersecting the gate wiring, a thin film transistor connected to the gate wiring and the data wiring, a pixel electrode connected to the thin film transistor and including first cutouts, a second insulating substrate facing the first insulating substrate, and a common electrode formed on the second insulating substrate and including second cutouts, wherein at least one of the first cutouts and the second cutouts has a width that gradually increases or decreases along a length thereof.

From a layout view, the first cutouts and the second cutouts may be alternately disposed, the width of the first cutouts may increase according to a first direction, and the width of the second cutouts may decrease according to the first direction. A difference between a maximum width and a minimum width of the first cutouts may be in a range of 2-5 um, a difference between a maximum width and a minimum width of the second cutouts may be in a range of 2-5 um, the minimum width of the first cutouts and the second cutouts may be in a range of 8-10 um, and the maximum width thereof is in a range of 11-13 um. The liquid crystal display may further include a first black matrix formed on the second insulating substrate, wherein from the layout view the first black matrix overlaps the first cutouts or the second cutouts. A second black matrix may be formed on the second insulating substrate, wherein from the layout view the second black matrix is disposed at a portion corresponding to between two neighboring pixel electrodes, and the first black matrix may be thinner than the second black matrix.

A liquid crystal display according to another exemplary embodiment of the present invention includes a first insulating substrate, gate wiring formed on the first insulating substrate, data wiring intersecting the gate wiring, a thin film transistor connected to the gate wiring and the data wiring, a pixel electrode connected to the thin film transistor and including first cutouts, a second insulating substrate facing the first insulating substrate, a black matrix formed on the second insulating substrate, an overcoat formed on the black matrix, and a common electrode formed on the overcoat and including second cutouts, wherein the first cutouts and the second cutouts have a width that gradually increases or decreases along a length thereof.

The black matrix may include a first black matrix disposed at a portion corresponding to the second cutouts and a second black matrix corresponding to a portion between two neighboring pixel electrodes, the thickness of the first black matrix is thinner than the thickness of the second black matrix, the thickness of the first black matrix may be about half of the thickness of the second black matrix, and the black matrix may include an organic insulator.

A method for manufacturing a liquid crystal display includes forming gate wiring on a first substrate, forming data wiring intersecting the gate wiring, forming a thin film transistor connected to the gate wiring and the data wiring, forming a pixel electrode connected to the thin film transistor and including first cutouts having a width that gradually increases or decreases along a length thereof, forming a common electrode including second cutouts having a width that gradually increases or decreases along a length thereof, and combining the first substrate and the second substrate.

Detailed comments of exemplary embodiment are included in the detailed description and drawings.

As described above, according to a liquid crystal display of exemplary embodiments of the present invention, a pixel electrode is divided into two sub-pixel electrodes that are driven by different thin film transistors, thereby improving the lateral visibility. Also, the width formed in the pixel electrode and the common electrode is gradually increased or decreased from the starting point toward the ending point, or a black matrix is disposed on the cutouts of the common electrode such that spots or instant afterimages generated on the cutouts that form the boundaries of the domains may be effectively prevented.

DESCRIPTION OF REFERENCE NUMERALS INDICATING CERTAIN ELEMENTS IN THE DRAWINGS

Figure 1:
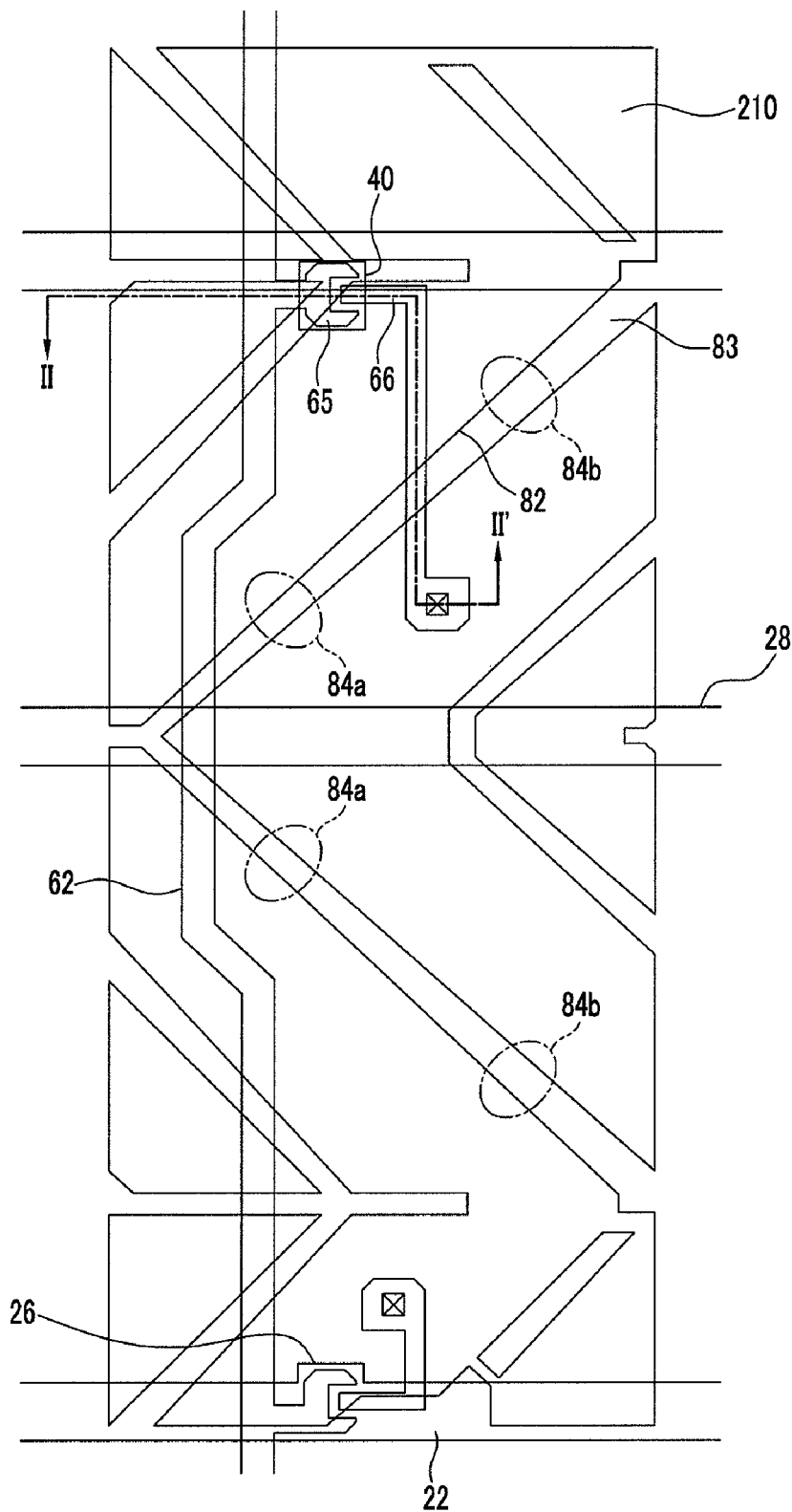
FIG. 1 is a layout view of a thin film transistor array panel for a liquid crystal display according to an exemplary embodiment of the present invention.

10: insulating substrate
22: gate line
26: gate electrode
28: storage wiring
30: gate insulating layer
40: semiconductor layer
55, 56: ohmic contact layer
62: data line
65: source electrode
66: drain electrode
70: passivation layer
76: contact hole
82: pixel electrode
83: pixel electrode cutout pattern
84a, 84b: singular point generated in the pixel electrode cutout pattern
144a, 144b: singular point generated in the common electrode cutout pattern
100: thin film transistor array panel,
200: common electrode panel
110: insulating substrate
120: black matrix
130: color filter
135: overcoat
140: common electrode
142: common electrode cutout pattern
300: liquid crystal layer
310: liquid crystal molecules
93a, 93b: sub-pixel electrode
93b_1: upper/lower electrode of a sub-pixel
93b_2: side electrode of a sub-pixel
210: cutout pattern of a common electrode covered by a black matrix
410: photomask glass
420: thick chromium layer (Cr)
421: halftone chromium layer
190: black matrix register (BM PR)

DETAILED DESCRIPTION OF EMBODIMENTS

The advantages, characteristics, and means for achieving them of the present invention will become apparent from reference to exemplary embodiments in the following detailed description accompanying the drawings.

However, the present invention is not limited by hereafter-disclosed exemplary embodiments, and may be modified in various different ways. Exemplary embodiments provide complete disclosure of the present invention and complete information of the scope of the present invention to those skilled in the art, and the present invention is defined by the scope of the claims. In the drawings, the sizes of layers and regions, and the relative sizes, may be exaggerated for clarity of the description.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Like reference numerals designate like elements throughout the specification.

The spatially relative terms "below", "beneath", "lower", "above", and "upper" may be used to describe the correlation between one element or constituent elements and another element or constituent elements as shown in the drawings. The spatially relative terms must be comprehended as terms including different directions of the element in addition to the direction shown in the drawings when in use or operation.

Exemplary embodiments described in this specification will be explained with a layout view, and a cross-sectional view which is an ideal schematic diagram of the present invention. Accordingly, the views may be changed by a manufacture technique and/or permissible errors. Further, exemplary embodiments of the present invention are not limited by the drawn specific shapes and include changes of the shapes that are generated according to a manufacturing process. The regions in the drawings include schematic properties, and the shapes of exemplary regions in the drawings are to indicate the specific shapes of the regions of the element, and not to limit the scope of the invention.

A liquid crystal display according to an exemplary embodiment of the present invention includes a thin film transistor array panel provided with thin film transistors applying voltages to pixel electrodes connected to gate lines and data lines, a common electrode panel facing the thin film transistor array panel and provided with a common electrode, and a liquid crystal layer formed between the thin film transistor array panel and the common electrode panel and including liquid crystal molecules of which long axes are vertically aligned to the surfaces of the two display panels.

A liquid crystal display according to an exemplary embodiment of the present invention will be described with the reference to FIG. 1 to FIG. 7B.

Figure 2:
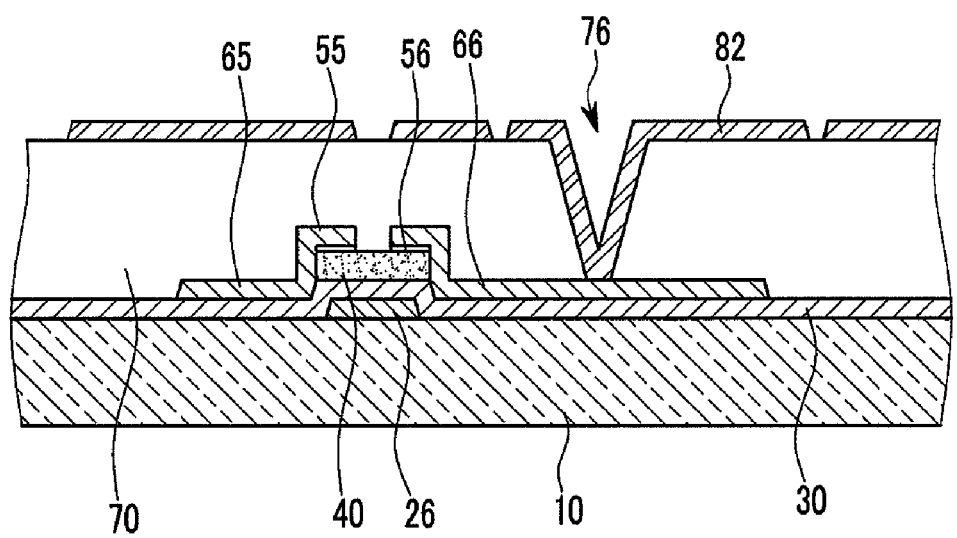
FIG. 2 is a cross-sectional view of the thin film transistor array panel shown in FIG. 1 taken along the line II-II'.

A thin film transistor array panel for a liquid crystal display according to an exemplary embodiment of the present invention will be described in detail with reference to FIG. 1 and FIG. 2. FIG. 1 is a layout view of a thin film transistor array panel for a liquid crystal display according to an exemplary embodiment of the present invention, and FIG. 2 is a cross-sectional view of the thin film transistor array panel shown in FIG. 1 taken along the line II-II'.

A gate line 22 is formed in the first direction, for example a horizontal direction, on an insulating substrate 10, and includes a gate electrode 26 with a protrusion shape. The gate line 22 and the gate electrode 26 are referred to herein as gate wiring.

Storage wiring 28 that is substantially parallel to the gate line 22 in the horizontal direction is formed on the insulating substrate 10. The storage wiring 28 overlaps a pixel electrode 82 in a pixel. The arrangement and the shape of the storage wiring 28 shown in FIG. 1 may be altered under the condition that the storage wiring 28 overlaps the pixel electrode 82 to form substantially uniform storage capacitance.

The gate wiring 22 and 26 and the storage wiring 28 may be made of aluminum-based metals such as aluminum (Al) and aluminum alloys, silver-based metals such as silver (Ag) and silver alloys, copper-based metals such as copper (Cu) and copper alloys, molybdenum-based metals such as molybdenum (Mo) and molybdenum alloys, chrome (Cr), titanium (Ti), tantalum (Ta), etc. Also, the gate wiring 22 and 26 and the storage wiring 28 may have a multi-layered structure including two conductive layers (not shown) having different physical properties. One of the two conductive layers may be made of a metal, for example aluminum, silver, or copper, having low resistivity to reduce a signal delay or a voltage drop. The other conductive layer may be made of a material, for example molybdenum, chromium, titanium, or thallium, for their physical, chemical, and electrical contact characteristics with other materials, particularly with indium tin oxide (ITO) and indium zinc oxide (IZO)

Examples of such a combination may include a chromium lower layer and an aluminum (alloy) upper layer, and an aluminum (alloy) lower layer and a molybdenum (alloy) upper layer. However, the present invention is not restricted thereto, and the gate wiring 22 and 26 and the storage wiring 28 may be made of various other metals or conductors.

A gate insulating layer 30 is formed on the gate wiring 22 and 26 and the storage wiring 28. The gate insulating layer 30 may be made of, for example, a silicon nitride (SiNx) or a silicon oxide (SiOx).

A semiconductor layer 40 that is made of hydrogenated amorphous silicon (a-Si), polysilicon, etc., is formed on the gate insulating layer 30.

The semiconductor layer 40 may have various shapes such as an island shape and a stripe shape.

For example, as shown in FIG. 1, the semiconductor layer 40 is formed with the island shape on the gate electrode 26.

Also, in another exemplary embodiment of the present invention, when the semiconductor layer 40 has a stripe shape, the semiconductor layer 40 may be disposed under the data line 62 and may be expanded on the gate electrode 26.

A pair of ohmic contacts 55 and 56, which are made of a material such as n+ hydrogenated amorphous silicon in which an n-type impurity is doped with a high concentration, or of silicide, are formed on the semiconductor layer 40. The ohmic contact layers 55 and 56 may have various shapes such as an island shape and a stripe shape. For example, as shown in FIG. 2, when the ohmic contact layers 55 and 56 have the island shape, the ohmic contact layers 55 and 56 may be respectively disposed under a drain electrode 66 and a source electrode 65. Also, in another exemplary embodiment of the present invention, when the ohmic contact layers 55 and 56 have the stripe shape, the ohmic contact layers 55 and 56 may be extended under the data line 62.

A data line 62 and a drain electrode 66 are formed on the ohmic contact layers 55 and 56 and the gate insulating layer 30. The data line 62 extends in a second direction, for example a vertical direction in FIG. 1, thereby intersecting the gate line 22.

The data line 62 has a source electrode 65 extending on the semiconductor layer 40. The source electrode 65 may have various shapes. The drain electrode 66 is separated from the source electrode 65 and disposed opposite to the source electrode 65 with respect to the gate electrode 26 on the semiconductor layer 40. The drain electrode 66 has one end with a linear shape and disposed on the semiconductor layer 40 and the other end with an enlarged width for connection to other layers and extended from the linear end portion.

The data line 62 including the source electrode 65 and the drain electrode 66 is referred to herein as data wiring.

The data wiring 62 and 66 is preferably formed of a refractory metal such as molybdenum, chromium, tantalum, or titanium, or an alloy thereof. The data wiring 62 and 66 may have a multi-layered structure of a refractory metal layer (not shown) and a low-resistance conductive layer (not shown). Examples of the multi-layered structure include a double-layered structure of a chromium (alloy) lower layer and an aluminum (alloy) upper layer, and an aluminum (alloy) lower layer and a molybdenum (alloy) upper layer, a triple-layered structure of a molybdenum (alloy) lower layer, an aluminum (alloy) intermediate layer, and a molybdenum (alloy) upper layer, etc.

The source electrode 65 overlaps at least a portion of the semiconductor layer 40, and the drain electrode 66 is disposed opposite to the source electrode 65 with respect to the gate electrode 26 and overlaps at least a portion of the semiconductor layer 40. The ohmic contact layers 55 and 56 are provided only between the underlying semiconductor layer 40 and the overlying source and drain electrodes so as to reduce contact resistance therebetween.

A passivation layer 70 is formed on the data line 62, the drain electrode 66, and the exposed semiconductor layer 40. The passivation layer 70 is formed of an inorganic insulator, such as a silicon nitride or silicon oxide, an organic insulator of a photosensitive organic material having a flatness characteristic, or an insulator having a low dielectric constant that is preferably 4.0 or less such as a-Si:C:O and a-Si:O:F, which are formed by a plasma enhanced chemical vapor deposition (PECVD) method. Also, the passivation layer 70 can have a dual-layered structure of a lower inorganic layer and an upper organic layer in order to substantially prevent damage to the exposed portion of the semiconductor 40 while maintaining the insulating characteristics of the organic layer.

The passivation layer 70 has a contact hole 76 exposing the expanded portion of the drain electrode 66.

A pixel electrode 82 is electrically connected to the drain electrode 66 through the contact hole 76 on the passivation layer 70 per each pixel. That is to say, the pixel electrode 82 is electrically connected to the drain electrode 66 through the contact hole 76 to thereby receive data voltages from the drain electrode 66. The pixel electrode 82 may be made of a transparent conductive material such as ITO or IZO, or a reflective metal such as aluminum, silver, or alloys thereof. An alignment layer (not shown), which aligns liquid crystal molecules, may be coated on the pixel electrode 82 and the passivation layer 70.

The pixel electrode 82 is divided into a plurality of regions by cutouts 83. The cutouts 83 include horizontal portions bisecting the pixel electrode 82 into upper and lower portions in the horizontal direction, and oblique portions respectively formed in the divided upper and lower portions of the pixel electrode 82 in the oblique direction. Here, the oblique portions of the upper and the lower portions are perpendicular to each other to distribute an inclination direction of the liquid crystal molecule in four directions.

Each of the oblique portion includes a portion disposed substantially at 45 degrees with respect to the gate line 22 and a portion disposed substantially at −45 degrees with respect to the gate line 22, and the cutouts 83 may have an inverse symmetric structure with respect to a horizontal center line parallel to the gate line 22 and bisecting the pixel electrode 191 into two partitions. For example, as shown in FIG. 1, the oblique portions of the cutouts 83 substantially forming the positive 45 degree angle with the gate line 22 may be disposed in the pixel electrode 82 disposed upward with respect to the center of the pixel, and the oblique portions of the cutouts 83 substantially forming the negative 45 degree angle with the gate line 22 may be disposed in the pixel electrode 82 disposed downward with respect to the central of the pixel. Here, the present invention is not restricted thereto, and the shapes of the arrangement of the oblique portions of the cutouts 83 may be formed within the range that the oblique portions of the cutouts 83 substantially form the positive and negative 45 degree angles with the gate line 22. Furthermore, the cutouts 83 or protrusions are referred to herein as a domain dividing means in an exemplary embodiment of the present invention. Hereafter, for better comprehension and ease of description, the cutouts 83 are described as the example of the domain dividing means in the present invention.

These cutouts 83 are formed to have a width that gradually increases or gradually decreases along a length thereof to substantially prevent spots and residual images from being generated in the inner portion, and particularly inside the oblique portion. For example, as shown in FIG. 1, the widths of the oblique portions of the cutouts 83 are gradually increase from the left side toward the right side of the drawing. Also, the cutouts 83 may deviate from the 45 degree angle with the gate line 22 due to the overall increasing and decreasing of the width of the cutouts 83 such that the transmittance may be deteriorated, but to substantially prevent this problem, it is preferable that the degree that the width of the cutouts 83 is increased or decreased may be minimized. For this purpose, it is preferable for the minimum width of the cutout 83 to be in the range of about 8 to 10 um (micrometer) and the maximum width of the cutout 83 to be in the range of about 11 to 13 um.

The cutouts 83 of the pixel electrode 82 and cutouts (referring to reference numeral 142 in FIG. 3) of a common electrode divide the display region of the pixel electrode 82 into a plurality of domains according to the directions that the main direction of the liquid crystal molecules included in the liquid crystal layer are arranged in when applying the electric field.

Figure 3:
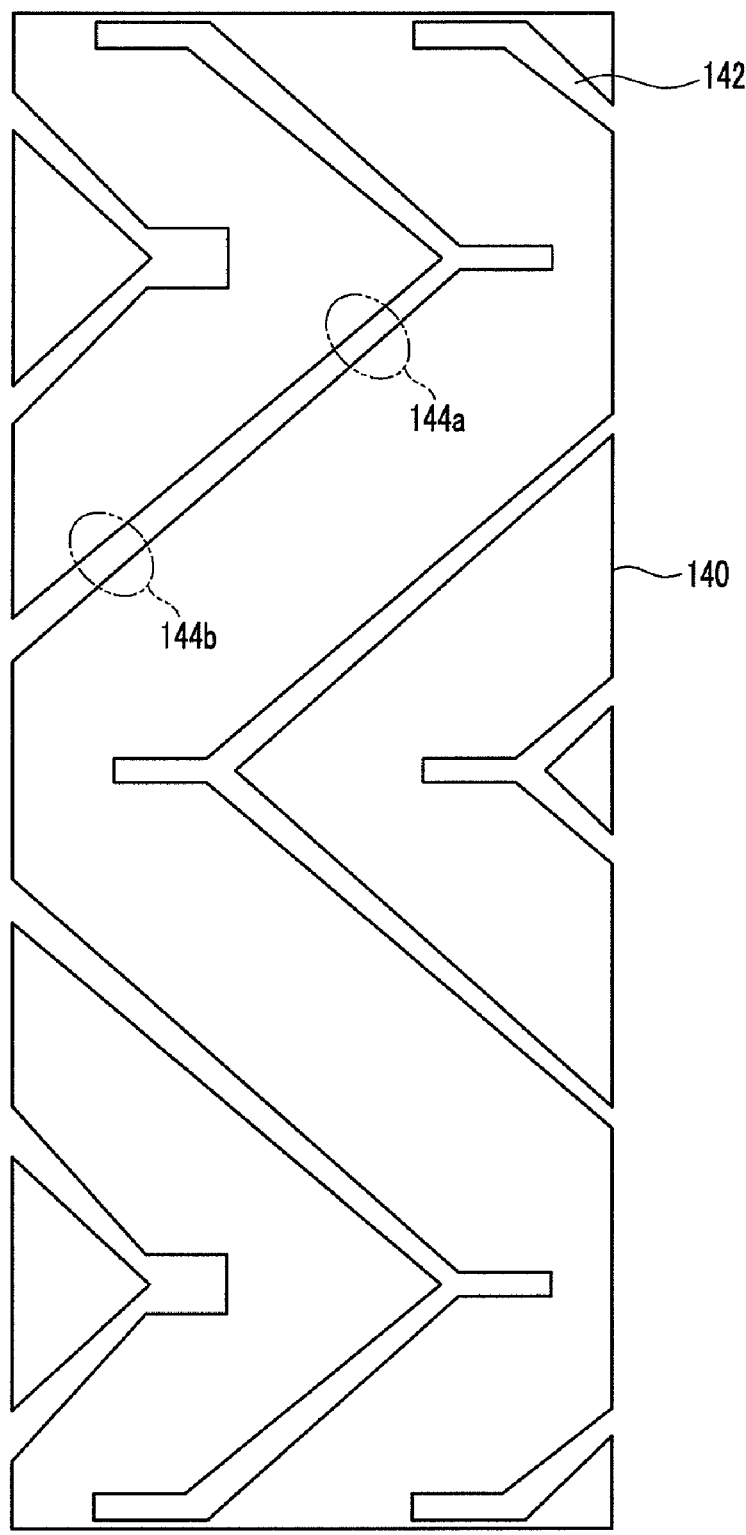
FIG. 3 is a layout view of a common electrode display panel for a liquid crystal display according to an exemplary embodiment of the present invention.

Here, the domains are the regions where the main direction of the liquid crystal molecules are disposed in a group according to the direction by the electric field formed between the pixel electrode 82 and the common electrode (referring to reference numeral 140 of FIG. 3).

A common electrode panel according to an exemplary embodiment of the present invention and the liquid crystal display including it will be described in detail with reference to FIG. 3 to FIG. 5. FIG. 3 is a layout view of a common electrode display panel for a liquid crystal display according to an exemplary embodiment of the present invention, FIG. 4 is a layout view of the liquid crystal display including the thin film transistor array panel of FIG. 1 and the common electrode panel of FIG. 3, and FIG. 5 is a cross-sectional view of the liquid crystal display shown in FIG. 4 taken along the line V-V'.

Figure 4:
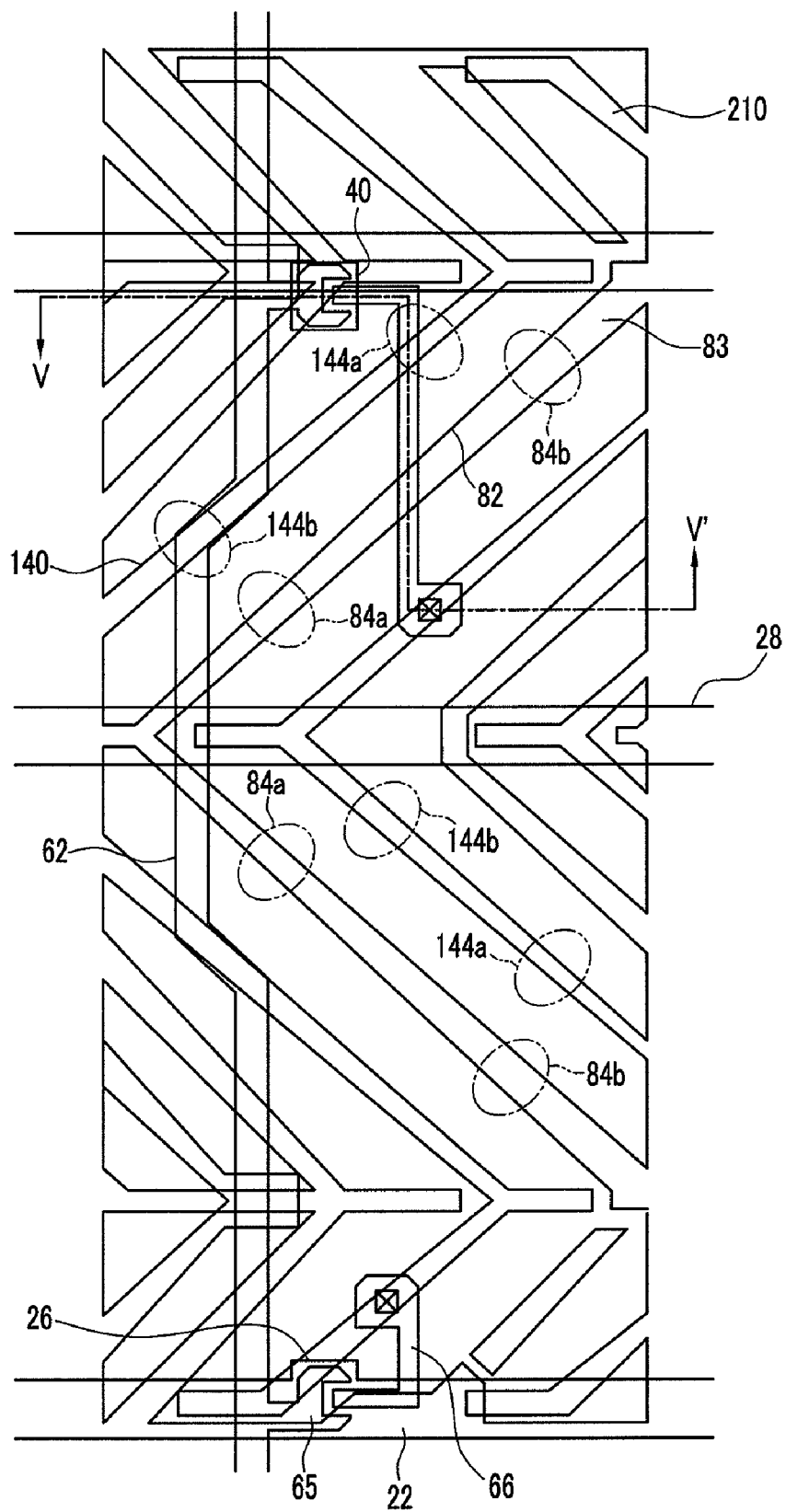
FIG. 4 is a layout view of the liquid crystal display including the thin film transistor array panel of FIG. 1 and the common electrode panel of FIG. 3.
Figure 5:
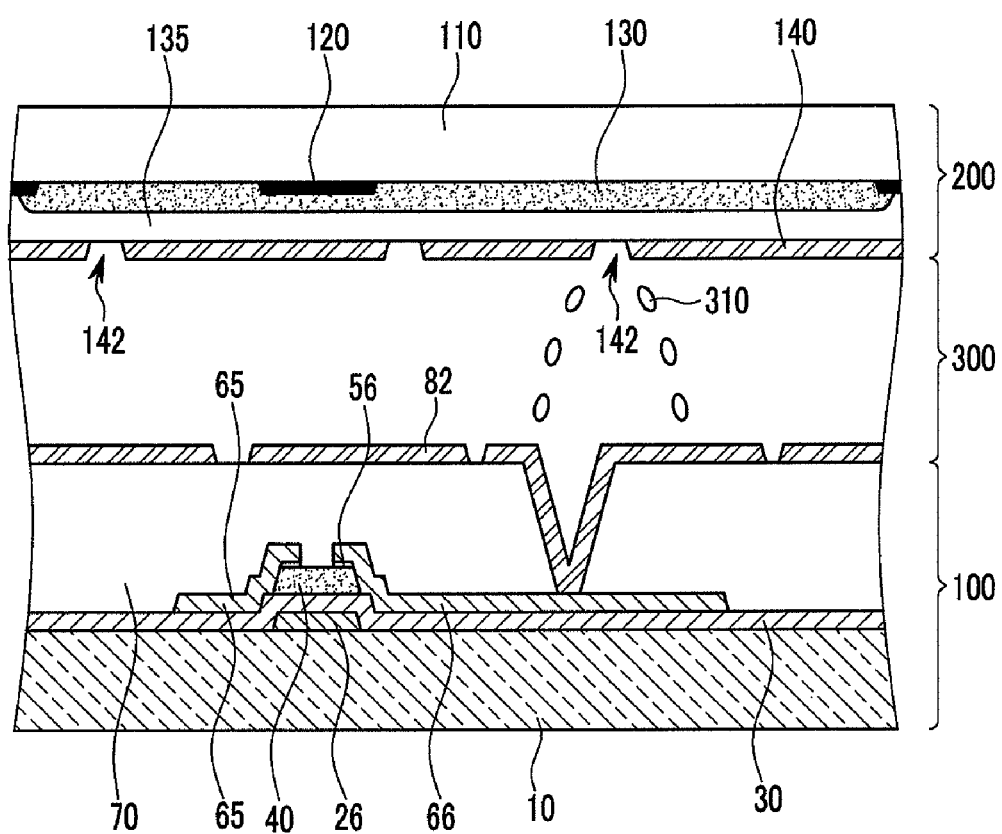
FIG. 5 is a cross-sectional view of the liquid crystal display shown in FIG. 4 taken along the line V-V'.

Referring to FIG. 3 to FIG. 5, a black matrix 120 for substantially preventing light leakage is formed on a transparent insulating substrate 110 made of a material such as glass. The black matrix 120 may be formed of a metal (a metal oxide) such as chromium and chromium oxide, or an organic black resist.

Color filters 130 of red, green, and blue are sequentially arranged in the pixel areas between the black matrix 120.

An overcoat 135 to flatten the steps of the color filters 130 may be formed on the color filters 130.

A common electrode 140 preferably made of a transparent conductive material such as ITO or IZO is formed on the overcoat 135. An alignment layer (not shown) for aligning the liquid crystal molecules may be formed on the common electrode 140.

The common electrode 140 is divided into a plurality of regions by the cutouts 142. Here, the cutouts 142 include end portions overlapping the edges of the cutouts 83 of the pixel electrode 82. The end portions of the cutouts 142 may include vertical end portions and horizontal end portions. Protrusions may be formed at the positions of the cutouts 142 to obtain the same effects as a substitution for the cutouts 142 in another exemplary embodiment of the present invention. The cutouts 142 or the protrusions may be referred to herein as the domain dividing means. Hereafter, for better comprehension and ease of description, the cutouts 142 will be described as the example of the domain dividing means in the present invention.

These cutouts 142 are formed to have a width that gradually increases or gradually decreases along a length to substantially prevent spots and residual images from being generated at the inner portion, and particularly inside the oblique portion. For example, as shown in FIG. 3, the width of the oblique portion of the cutouts 142 gradually decreases from the left side toward the right side of the drawing. In this way, the widths of the cutouts 142 of the common electrode 140 increase or decrease in the opposite direction to those of the cutouts 83 of the pixel electrode 82. This will be described in detail.

As shown in FIG. 4, it is preferable that the oblique portions of the cutouts 83 of the pixel electrode 82 are arranged in the same direction as the cutouts 142 of the common electrode and parallel to the cutouts 142 of the common electrode.

Here, the oblique portions of the cutouts 83 of the pixel electrode 82 and the oblique portions of the cutouts of the common electrode 140 are alternately arranged with each other such that the electric field formed between the common electrode 140 and the pixel electrode 82 has a horizontal electric field component that is vertical with respect to the cutouts 83 and 142. Here, the horizontal electric field component means an electric field component that is substantially parallel to the surfaces of the substrates 10 and 110.

As shown in FIG. 5, the thin film transistor array panel 100 and the common electrode panel 200 are aligned with each other, and a liquid crystal layer 300 including liquid crystal molecules 310 is formed therebetween and vertically aligned to form a base structure of the liquid crystal display according to an exemplary embodiment of the present invention.

In a state where an electric field formed between the pixel electrode 82 and the common electrode 140 is not applied, the direction of the liquid crystal molecules 310 included in the liquid crystal layer 300 are vertically aligned with respect to the thin film transistor array panel 100 and the common electrode panel 200, and the liquid crystal molecules 310 included in the liquid crystal layer 300 have negative dielectric anisotropy. The thin film transistor array panel 100 and the common electrode panel 200 are aligned such that the pixel electrodes 82 overlap the color filters 130. Accordingly, the pixel is divided into a plurality of domains by the cutouts 83 and 142 of the common electrode 140 and the pixel electrode 82.

The liquid crystal display may be completed by adding elements such as polarizers and a backlight to the base structure. For example, the polarizers are disposed one by one on both sides of the base structure, and one of the transmissive axes thereof is parallel to the gate line and the other is vertical to the gate line.

When applying the electric field between the thin film transistor array panel 100 and the common electrode panel 200, the electric field can include the electric field component that is substantially perpendicular to the two display panels 100 and 200, and the horizontal electric field components near the cutouts 83 and 142 of the pixel electrode 82 and the common electrode 140. These horizontal electric fields have the function of facilitating the alignment of the liquid crystal molecules 310 of each domain.

Because the liquid crystal molecules 310 according to an exemplary embodiment have negative dielectric anisotropy, when applying the electric field to the liquid crystal molecules 310, the liquid crystal molecules 310 in each domain are disposed in the direction perpendicular to the cutouts 83 or 142 defining the domains. Accordingly, the liquid crystal molecules 310 are disposed in opposite directions on both sides with respect to the cutouts 83 and 142 as a center, and because the oblique portions of the cutouts 83 and 142 are symmetrical with respect to the center of the pixel, the liquid crystal molecules 310 are disposed in the four directions substantially forming the 45 degree or −45 degree angles with respect to the gate line 22. In this way, the optical characteristics are compensated by the liquid crystal molecules 310 that are disposed in the four directions, thereby widening the viewing angle.

Figure 6:
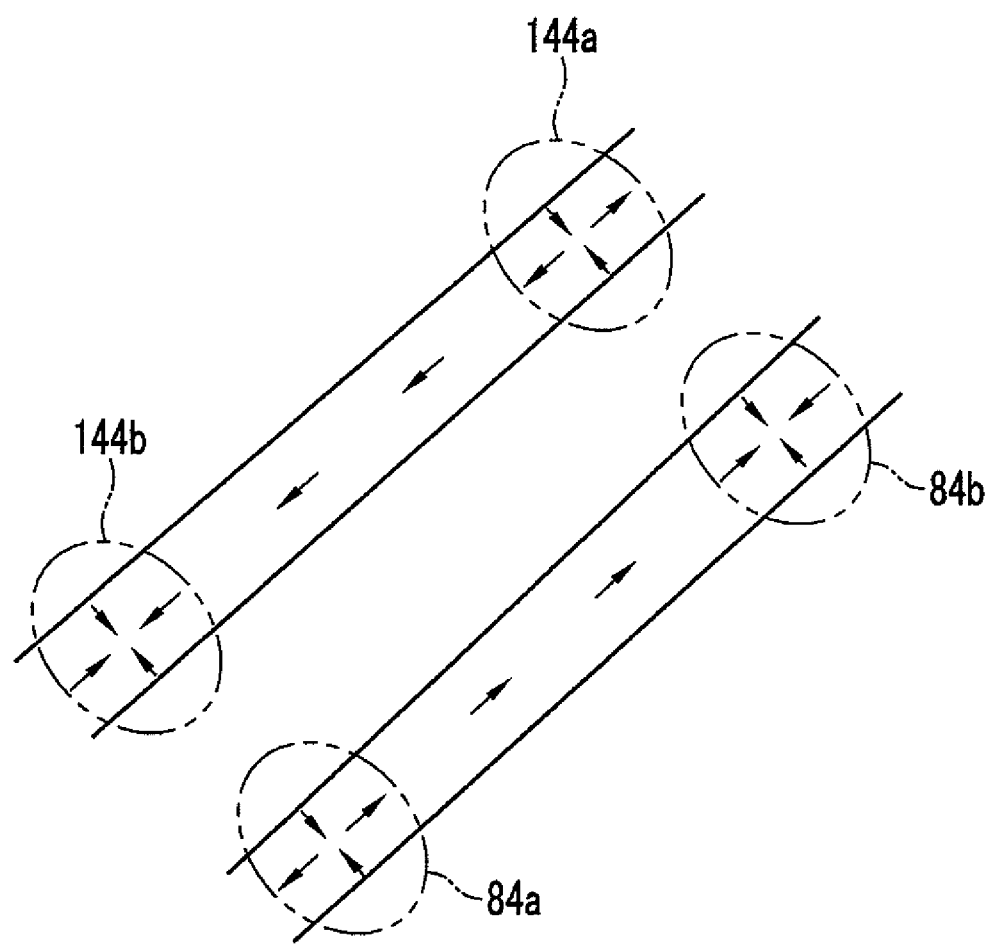
FIG. 6 is an enlarged layout view of the cutouts of the pixel electrode and the common electrode in FIG. 4.
Figure 7A:
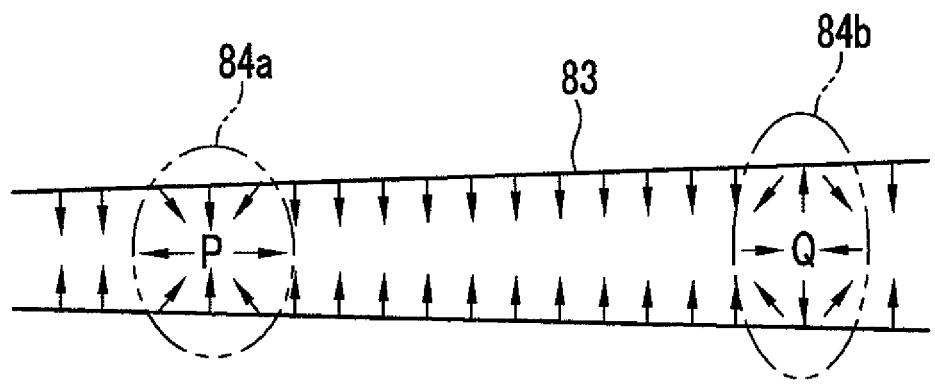
FIG. 7A is a schematic diagram showing an initial arrangement of the liquid crystal molecules after applying an electric field to the pixel electrode and the common electrode.
Figure 7B:
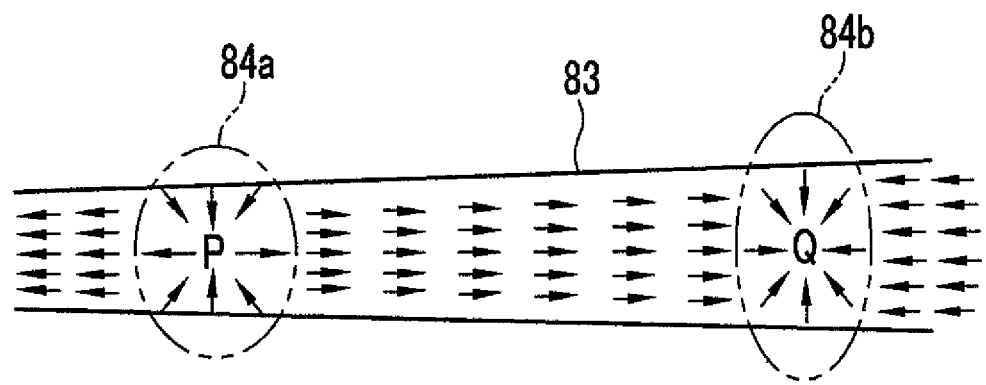
FIG. 7B is a schematic diagram showing a subsequent arrangement of the liquid crystal molecules after applying an electric field to the pixel electrode and the common electrode.

The cutouts and the operations thereof of the liquid crystal display according to an exemplary embodiment of the present invention will be described in detail with reference to FIG. 4, and FIG. 6 to FIG. 7B. FIG. 6 is an enlarged layout view of the cutouts of the pixel electrode and the common electrode in FIG. 4. FIG. 7A is a schematic diagram showing an initial arrangement of the liquid crystal molecules disposed on the cutouts after applying an electric field to the pixel electrode and the common electrode, and FIG. 7B is a schematic diagram showing a subsequent arrangement of the liquid crystal molecules disposed on the cutouts after applying an electric field to the pixel electrode and the common electrode.

As shown in FIG. 4 and FIG. 6, the cutouts 83 of the pixel electrode 82 include the oblique portions substantially forming the angles of 45 degrees or −45 degrees with respect to the gate line 22, and the cutouts 142 of the common electrode 140 include the oblique portions substantially forming the angles of 45 degrees or −45 degrees with respect to the gate line 22. The oblique portions of the cutout 83 and the oblique portions of the cutouts 142 are alternately disposed.

To substantially prevent spots or residual images in the liquid crystal display, the width of the cutouts 83 gradually increases or gradually decreases from one side toward the other end side, and the width of the cutouts 142 also gradually increases or gradually decreases from one side toward the other end side. Here, the increasing or decreasing directions of the cutouts and the cutouts 142 are opposite to each other. That is to say, if the width of the cutouts 83 is gradually increased from the left end toward the right end, the width of the cutouts 142 is gradually decreased from the left end toward the right end. In contrast, if the width of the cutouts 83 is gradually decreased from the left end toward the right end, the width of the cutouts 142 is gradually increased from the left end toward the right end.

The shape of the cutouts 83 and 142 may be an isosceles trapezoid shape having a high height, but the present invention is not limited thereto. However, if the difference between two ends of the cutouts 83 and 142 is large, the degree that the angle between the polarization direction of the light and the cutouts 83 and 142 deviate from 45 degrees become large such that light transmittance may be deteriorated, and accordingly, to minimize this problem, if the width of the one end of the cutouts 83 and 142 is in the range of about from 8 to 10 um, the width of the other end thereof may be in the range of about from 11 to 13 um. Therefore, when the width of the cutouts 83 and 142 gradually increases or decreases, the arrangement direction of the liquid crystal molecules disposed in the region corresponding to the cutouts 83 and 142 as the boundaries of the domains may be determined. Here, the protrusions preferably made of an inorganic material or an organic material may be formed on the pixel electrode 82 or the common electrode 140 as the domain dividing means as a substitution for the cutouts 83 and 142, and the width of the protrusions as the domain dividing means may gradually increase or decrease to determine the arrangement direction of the liquid crystal molecules disposed in the region corresponding to the cutouts 83 and 142 as the boundaries of the domains.

In detail, referring to FIG. 6, FIG. 7A, and FIG. 7B, when showing the initial and subsequent arrangements of the liquid crystal molecules disposed on the cutouts 83 and 142 after applying the electric field between the pixel electrode 82 and the common electrode 140, singular points 84a, 84b, 144a, and 144b are intentionally formed in the cutouts 83 and 142 such that the elastic energy of the liquid crystal molecules disposed near the singular points 84a, 84b, 144a, and 144b is largely accumulated and thereby the arrangement direction A of the heads of the liquid crystal molecules may be previously determined.

For example, the negative singular point at which some head directions (arrow direction) of the liquid crystal molecules are emitted outward and the other head directions of the liquid crystal molecules are converged on the singular points 84a and 144a are formed on the narrow portions of the cutout patterns 83 and 142. Also, the positive singular point at which the head directions of the liquid crystal molecules are converged on the singular points 84b and 144b are formed on the wide portions of the cutout patterns 83 and 142. Accordingly, the negative singular points 84a and 144a and the positive singular points 84b and 144b are alternately disposed such that the heads of the liquid crystal molecules disposed on the boundaries of the domains face from the negative singular points 84a and 144a toward the positive singular points 84b and 144b, thereby previously determining the arrangement direction of the heads of the liquid crystal molecules. In this way, the widths of the cutouts are varied such that the arrangement directions of the liquid crystal molecules disposed on the boundaries of the domains, that is to say inside of the cutouts 83 and 142, are previously determined, and as a result, with the end of the application of the driving voltage, the phenomenon in which the arrangement distortion of the liquid crystal molecules generated on the boundaries of the domains is spread to the inner part of the domains may be suppressed.

Accordingly, the liquid crystal molecules disposed on the boundaries of the domains may be stably and regularly arranged by using the increasing and decreasing widths of the cutouts such that the spots or the residual images generated on the boundaries of the domains may be substantially prevented.

To substantially prevent the spots or the residual images from being generated on the boundaries of the domains, it is preferable that the widths of the cutouts increase or decrease from first ends of the cutouts 83 and 142 toward the other ends of the cutouts 83 and 142. For example, it is preferable that the widths of the cutouts 83 and 142 gradually increase from the negative singular points 84a and 144a toward positive singular points 84b and 144b. In this case, a driving force (arrow direction) that the heads of the liquid crystal molecules face from the negative singular points 84a and 144a formed on the narrow widths of the cutouts 83 and 142 toward the positive singular points 84b and 144b formed on the wide widths of the cutouts 83 and 142.

Accordingly, the liquid crystal molecules disposed in the cutouts 83 and 142 may be arranged in the determined direction in a shorter time.

Also, the enhanced arrangement driving force may suppress generation of at least one of singular points between the negative singular points 84a and 144a and the positive singular points 84b and 144b.

When the arrangement driving force is weak, the singular point may be additionally generated between the negative singular points 84a and 144a and the positive singular points 84b and 144b. In this way, when the singular point is generated in the cutouts 83 and 142 beside the negative singular points 84a and 144a and the positive singular point 84b and 144b, the position of the singular point is changed in the cutouts whenever the driving voltage is applied such that the viewing angle is changed, and as a result, the difference of the luminance is recognized by the viewer such that the temporary residual image appears.

In the present invention, the widths of the cutouts 83 and 142 gradually increase or decrease from one end toward the other end such that the additional generation of the singular point may be suppressed between the negative singular points 84a and 144a and the positive singular points 84b and 144b.

Here, the maximum width of the cutouts 83 and 142 is in the range of about from 11 to 13 um, and the minimum width thereof is in the range of about from 8 to 10 um.

Also, the cutouts 83 may deviate from the 45 degree angle with the gate line 22 due to the entire increasing and decreasing of the width of the cutouts 83 such that the optical characteristics are not optimized between the alignment direction of the liquid crystal molecules and the polarization direction, and the transmittance may be deteriorated. To substantially prevent this problem, it is preferable that the degree of which the width of the cutouts 83 is increased or decreased may be minimized. Accordingly, the difference between the maximum width of the cutouts 83 and 142 and the minimum width thereof is in the range of about 3 to 5 um.

Also, to substantially arrange the liquid crystal molecules disposed in the domains for the gate line 22 at 45 degree or −45 degree angles, it is preferable for the cutouts 83 and 142 of the upper and the lower substrates to be alternately arranged, and if the width of the cutout of the lower substrate gradually increases from the left side toward the right side, the width of the cutout 142 of the upper substrate gradually decreases from the left side toward the right side.

A real pixel shape of the liquid crystal display will be described with reference to FIG. 8 to FIG. 13 through the sub-pixel pixel electrode of the present invention described in FIG. 1 to FIG. 7.

Figure 8:
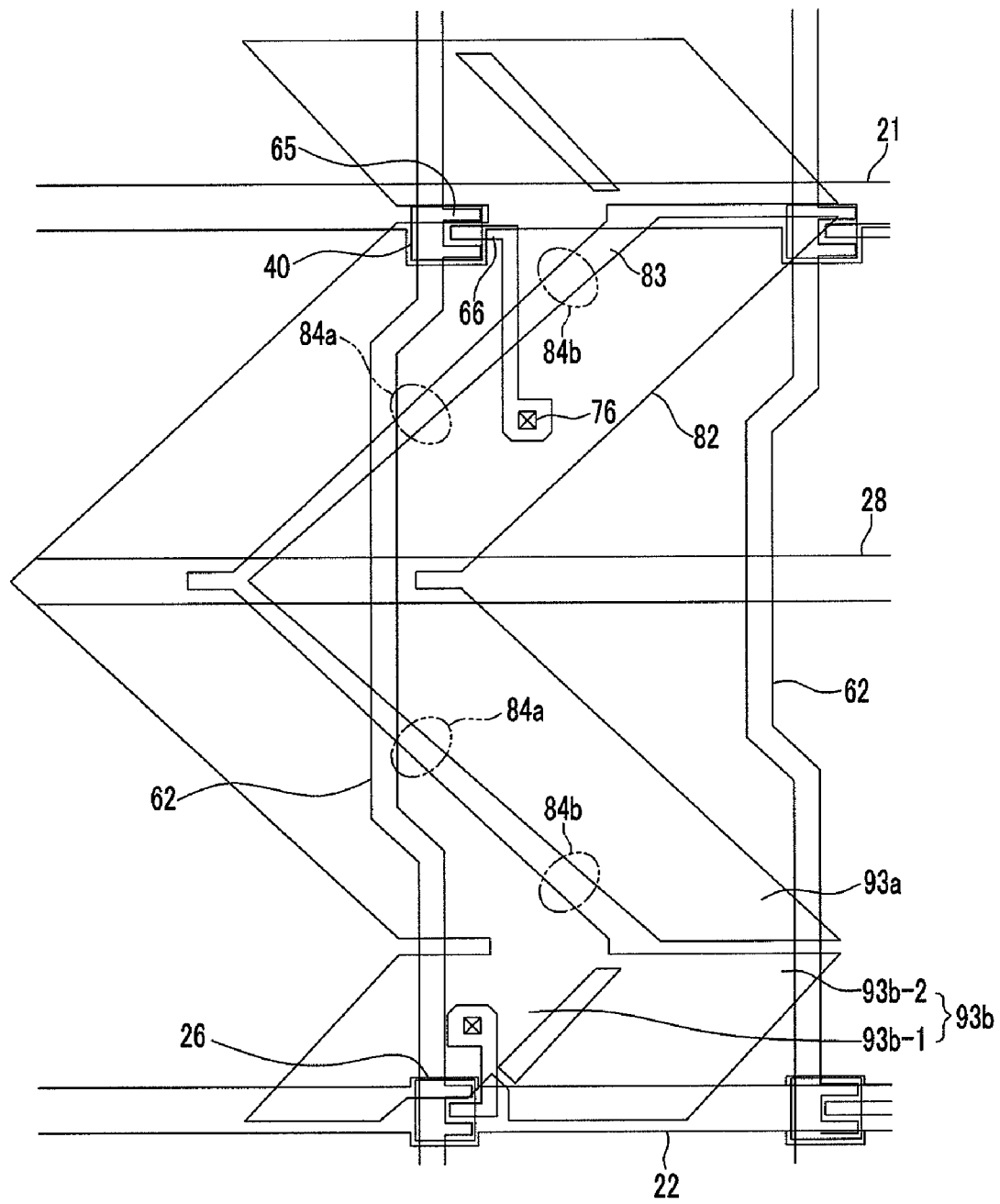
FIG. 8 is a layout view of the connected sub-pixels in the thin film transistor array panel for the liquid crystal display of FIG. 1.

FIG. 8 is a layout view of connected sub-pixels in the thin film transistor array panel for the liquid crystal display of FIG. 1.

Figure 9:
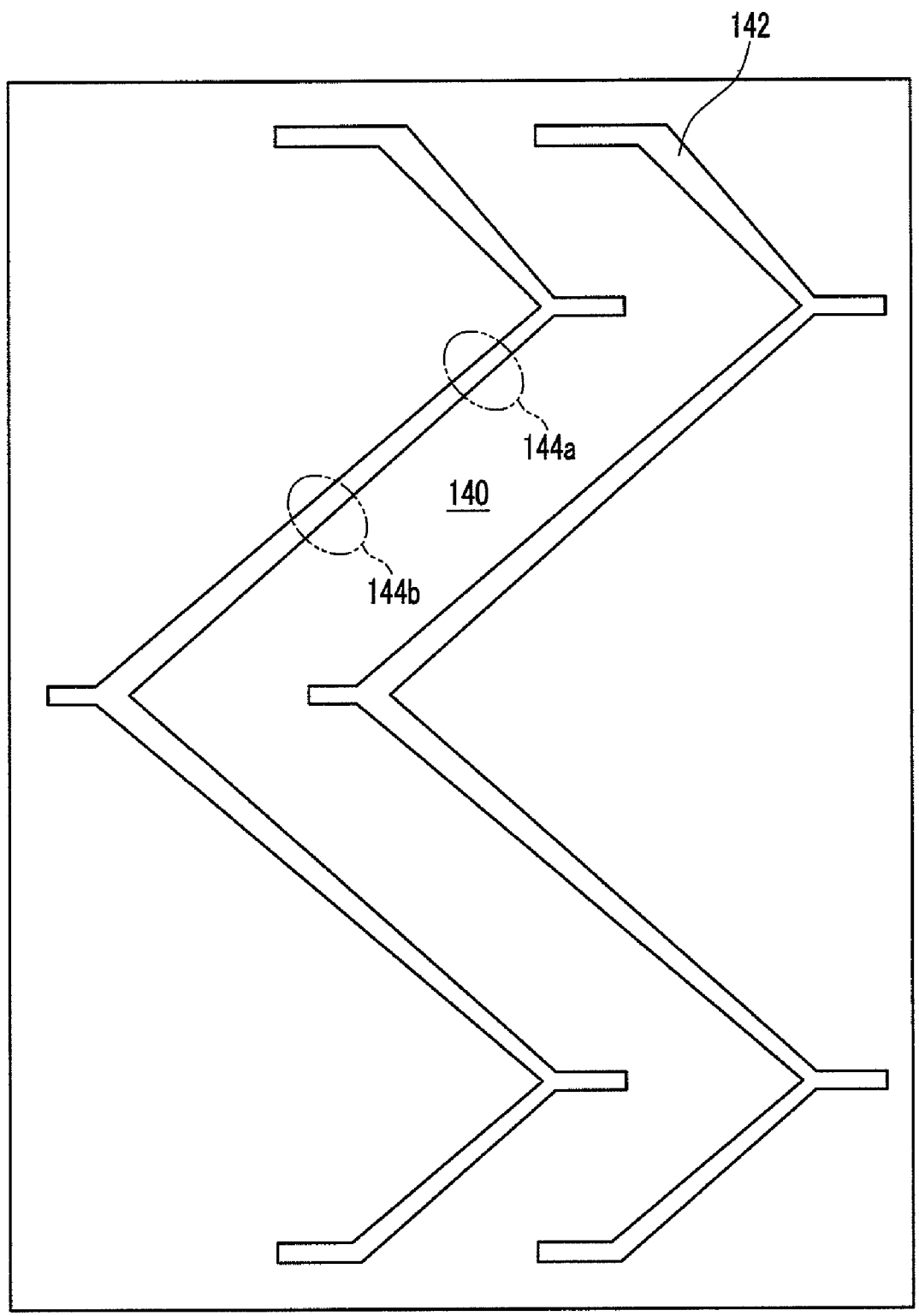
FIG. 9 is a layout view of the common electrode panel of the liquid crystal display corresponding to FIG. 8.
Figure 10:
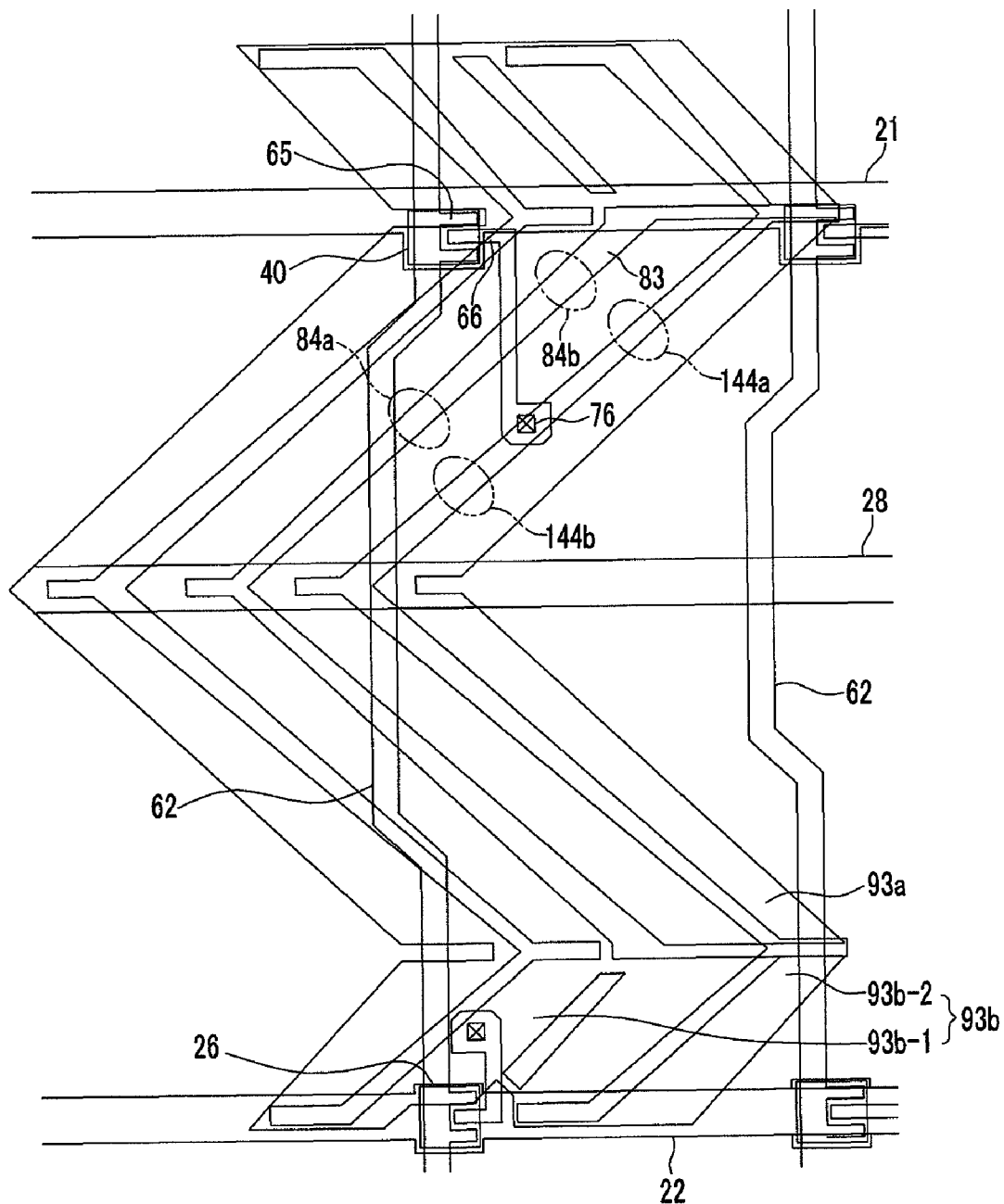
FIG. 10 is a layout view of the liquid crystal display including the thin film transistor array panel of FIG. 8 and the common electrode panel of FIG. 9.

FIG. 9 is a layout view of the common electrode panel of the liquid crystal display corresponding to FIG. 8, and FIG. 10 is a layout view of the liquid crystal display including the thin film transistor array panel of FIG. 8 and the common electrode panel of FIG. 9.

As shown in FIG. 8 to FIG. 10, the liquid crystal display differently shown as an exemplary embodiment of the present invention includes the thin film transistor array panel, the common electrode panel facing the thin film transistor array panel, and the liquid crystal layer formed between two display panels.

The thin film transistor array panel of the liquid crystal display according to an exemplary embodiment of the present invention of FIG. 1 will be described in detail with the reference to FIG. 8 with respect to the pixel electrode.

When entirely considering the pixel electrode 82, both sides of the pixel electrode 82 form the declination with a first gate line 21 and a second gate line 22 and have an extended zigzag shape. The right and left edges of the pixel electrode 82 may be extended substantially parallel to each other with the same shape.

The right and left edges of the pixel electrode 82 have at least one bent portion because of the zigzag shape.

In FIG. 8, a pixel electrode 82 provided with three bent portions is shown.

The pixel electrode 82 is divided into a first sub-pixel electrode 93a and a second sub-pixel electrode 93b. Pairs of gray voltage groups having the different gamma curved lines that are gained from the same image information are respectively applied to the first and second sub-pixel electrodes 93a and 93b, and the gamma curve line of the voltage of one pixel becomes a curved line when the gamma curve lines are combined. When the pairs of gray voltage groups are determined, the combined gamma curve at the front is closer to the reference gamma curve at the front, and the combined gamma curve at the lateral side is closer to the reference gamma curve at the front to improve the lateral visibility.

As above-described, the pixel electrode 82 has three bent portions, but the number of bent portions is not limited thereto. The pixel electrode 82 includes the first sub-pixel electrode 93a and the second sub-pixel electrode 93b enclosing the edges of the first sub-pixel electrode 93a except for the right edge of the first sub-pixel electrode 93a.

The first sub-pixel electrode 93a and the second sub-pixel electrode 93b are separated from the cutout 83 which is extended in the vertical direction with the approximate zigzag shape.

The first sub-pixel electrode 93a has a laid "V" shape. Also, the second sub-pixel electrode 93b includes a side electrode 93b_1 that is disposed substantially parallel to the first sub-pixel electrode 93a on the left side thereof and has a zigzag shape that is bent three times, and a pair of upper and lower electrodes 93b_2 that are disposed on and under the first sub-pixel electrode 93a. The side electrode 93b_1 and the upper and lower electrodes 93b_2 forming the second sub-pixel electrode 93b are electrically connected through predetermined connections. Accordingly, the second sub-pixel electrode 93b encloses the edges except for the right edge of the first sub-pixel electrode 93a.

An alignment layer (not shown) may be further proved on the first and second sub-pixel electrodes 93a and 93b.

Referring to FIG. 9 and FIG. 10, describing the upper panel, color filters (not shown) of red, green, and blue are sequentially arranged in the pixel areas enclosing the black matrix. The color filters are aligned to overlap the first and second sub-pixel electrodes 93a and 93b.

Here, the common electrode 140 faces the pixel electrode 82, and is divided into a plurality of regions by the cutouts 142. The cutouts 142 include oblique portions alternately disposed and substantially parallel to the oblique portions of the pixel electrode 82, and horizontal portions overlapping the horizontal portions of the cutouts 83 of the pixel electrode 82. Furthermore, in a modified exemplary embodiment of the present invention, protrusions may be formed as the domain dividing means as a substitution for the cutouts 83. Hereafter, for better comprehension and ease of description, the cutouts 83 are described as the domain dividing means, and the shape of the cutouts 83 is formed to have a width that is gradually increased or decreased to substantially prevent the generation of the spots and the residual images, like the previous exemplary embodiment. Also, it is preferable that the cutouts 83 and 142 of the upper and lower substrates are alternately disposed, and that the width of the cutouts 142 of the upper substrate gradually decreases from the left side toward the right side when the width of the cutouts 83 of the lower substrate gradually increases from the left side toward the right side.

Figure 11:
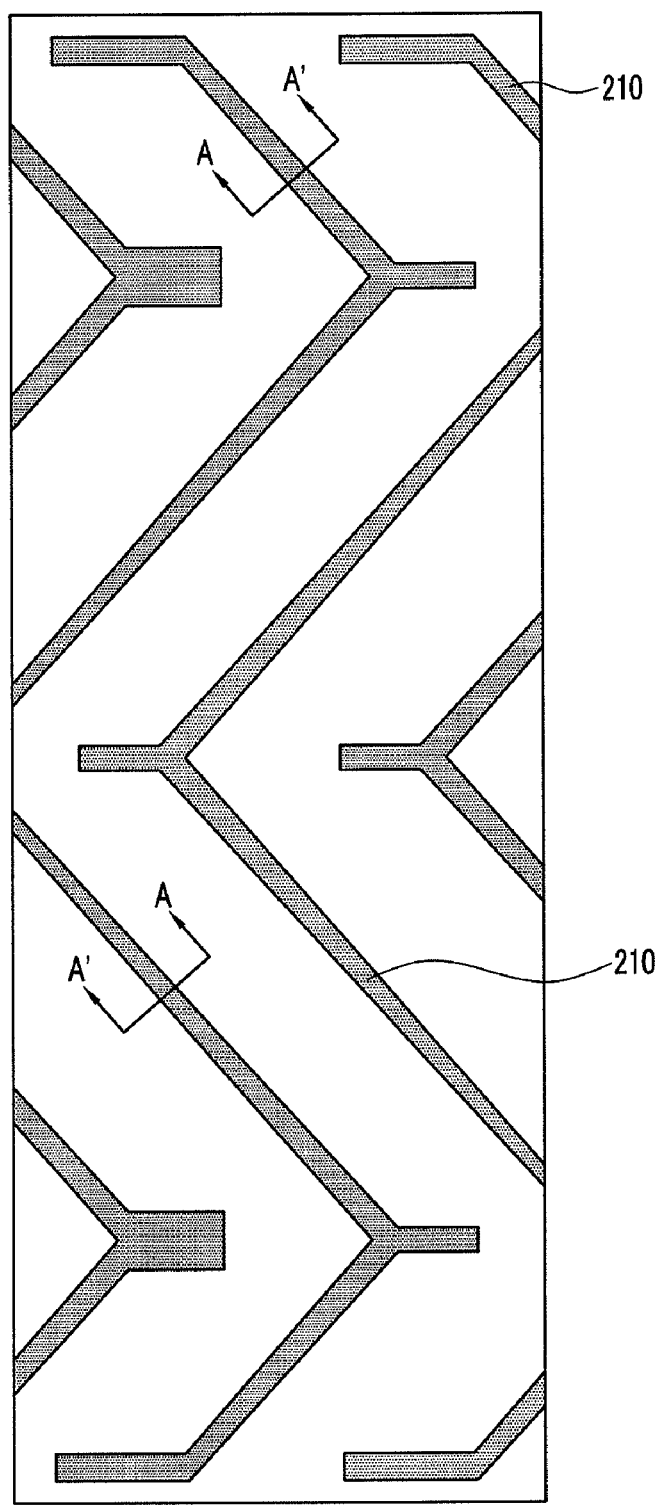
FIG. 11 is a layout view of a common electrode panel of a liquid crystal display according to another exemplary embodiment of the present invention.

FIG. 11 is a layout view of a common electrode panel of a liquid crystal display according to another exemplary embodiment of the present invention.

Figure 12:
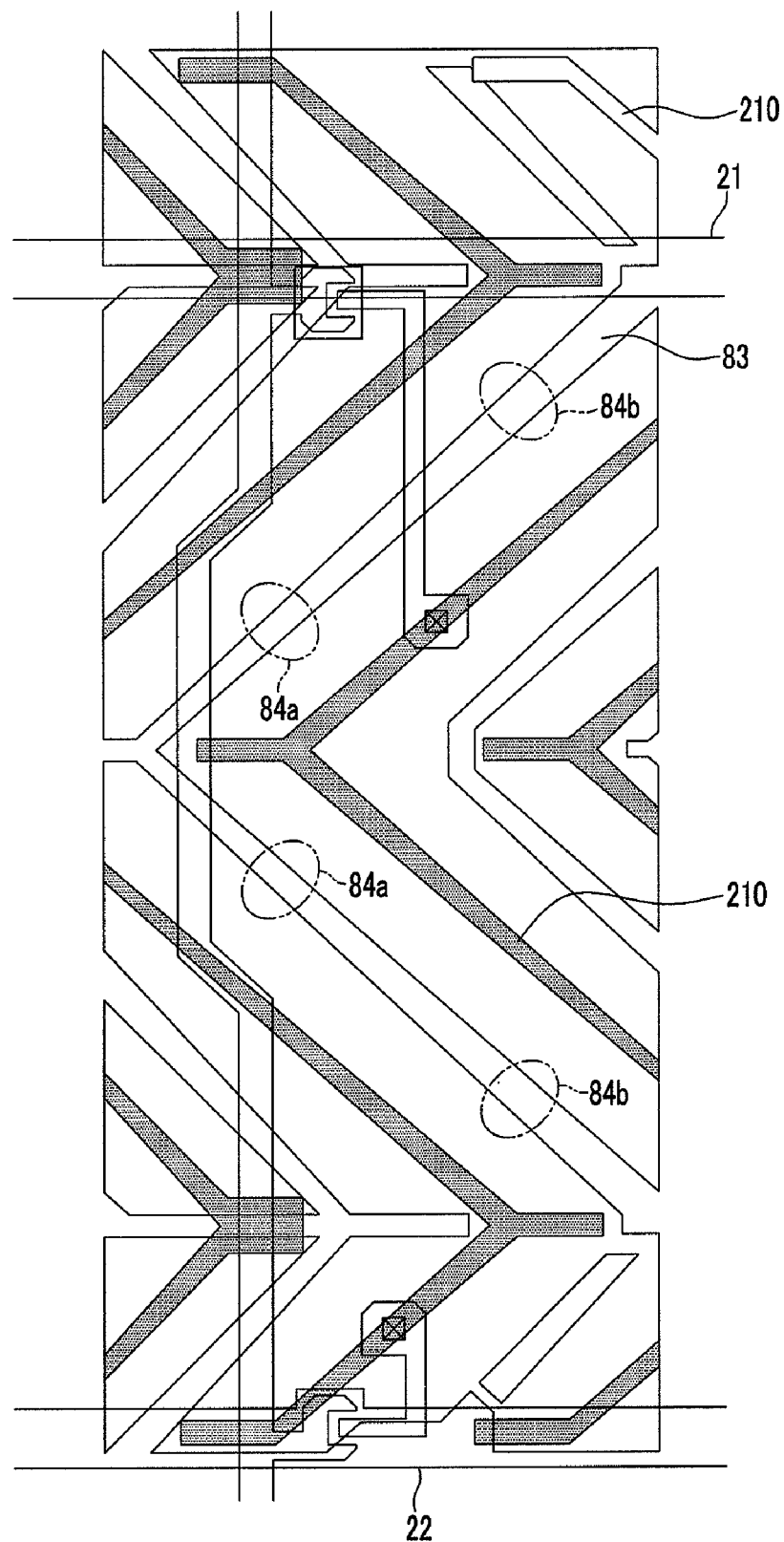
FIG. 12 is a layout view of a liquid crystal display including the thin film transistor array panel of FIG. 1 and the common electrode panel of FIG. 11.
Figure 13:
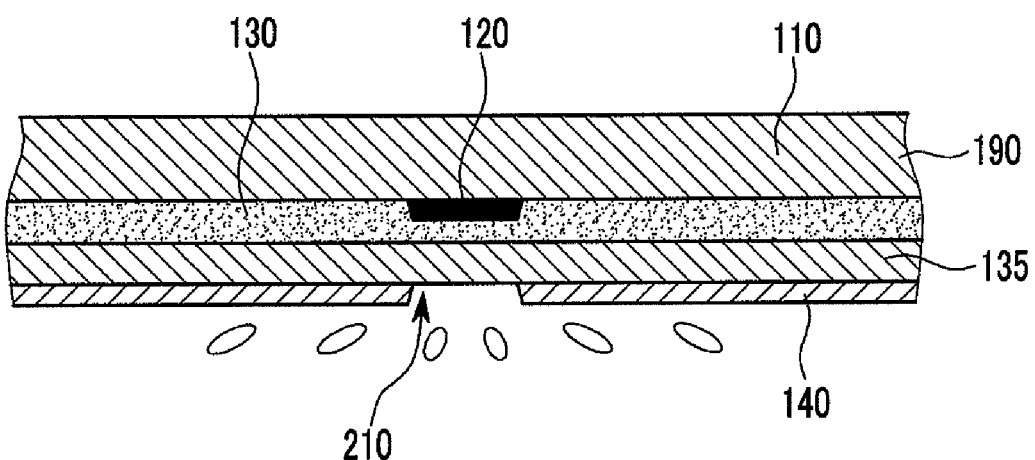
FIG. 13 is a cross-sectional view of the liquid crystal display shown in FIG. 11 taken along the line A-A'.

FIG. 12 is a layout view of a liquid crystal display including the thin film transistor array panel of FIG. 1 and the common electrode panel of FIG. 11, and FIG. 13 is a cross-sectional view of the liquid crystal display shown in FIG. 11 taken along the line A-A'.

Figure 14A:
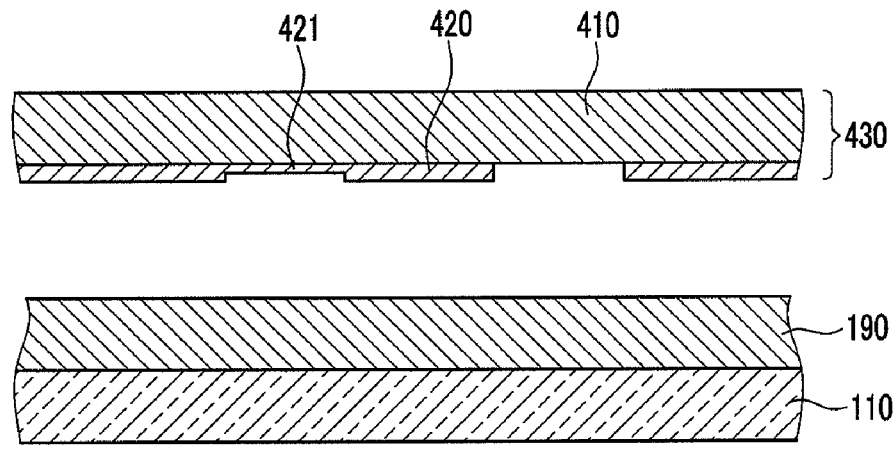
FIG. 14A to FIG. 14C are layout views showing the manufacturing process for forming a black matrix having a double thickness formed simultaneously between the common electrode and a color filter of FIG. 11.
Figure 14B:
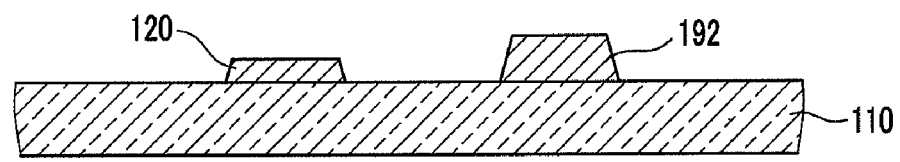
Figure 14C:
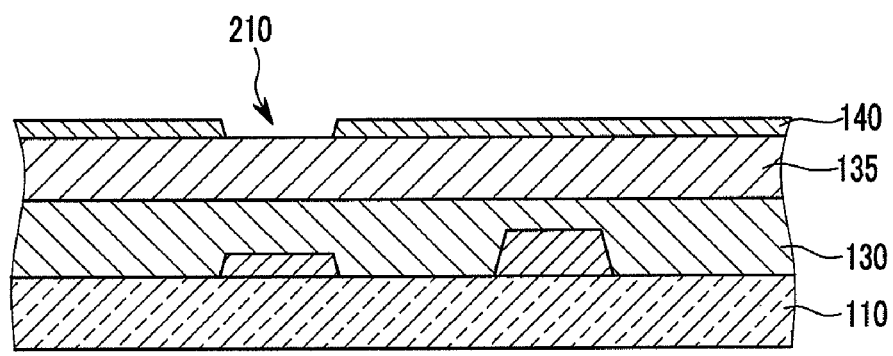

FIG. 14A to FIG. 14C are layout views showing the manufacturing process for forming a black matrix having a double thickness formed simultaneously between the common electrode and a color filter of FIG. 11.

Referring to FIG. 11 to FIG. 14, cutouts 210 of a common electrode shown in FIG. 11 have uniform widths. However, as shown in FIG. 12, cutouts of the pixel electrode cutout have a width that gradually increases or decreases along a length, similar to the structure of FIG. 1.

That is to say, in the lower panel including thin film transistors with the same structure of FIG. 1, the width of the cutouts 83 of the pixel electrode gradually increases or decreases from one end toward the other end, and referring to FIG. 13, a black matrix 120 is thinly formed at a portion where the cutouts 210 of the common electrode are disposed such that the black matrix 120 blocks the cutouts to thereby substantially prevent the recognition of the spots and the residual images generated by the change of the singular point. Also, as shown in FIGS. 14A to 14C, the black matrix 120 formed to overlap cutouts 210 of the common electrode on the insulating substrate 110 is formed along with a thick black matrix 192 disposed at the boundaries of pixels.

In connection with this, a more detail explanation follows.

As the first step as shown in FIG. 14A, if a negative photosensitive film 190 formed on the insulating substrate 110 is exposed by using a photomask 430 including a transparent substrate 410, a thick layer 420 completely blocking the light and made of chromium and a thin layer 421 for executing a halftone exposure, because the light is completely blocked at the portion of the photosensitive film 190 corresponding to the thick layer 420, the monomers remain, and because the portion of the photosensitive film 190 corresponding to the thin layer 421 weakly receives the light, the monomers are partially combined to thereby form a polymer. Also, because the portion of the photosensitive film 190 corresponding to the portion where the chromium layer does not exist enough receives the light, the monomers of the total thickness are formed into the polymer.

As shown in FIG. 14B, if the exposed photosensitive film 190 is developed, a thin black matrix 120 is formed at the region that is halftone-exposed through the thin layer 421 of the photomask 430, and a thick black matrix 192 is formed at the region that is completely exposed. The difference between the thicknesses of two black matrixes 120 and 192 may be controlled by the thickness of the thin layer 421 of the photomask 430, and the thickness of the thin black matrix 120 may be about half of the thickness of the thick black matrix 192.

As shown in FIG. 14C, a color filter 130, an overcoat 135, and a common electrode 140 are sequentially formed on the black matrix 120 and 192 having the different thicknesses.

Figure 15:
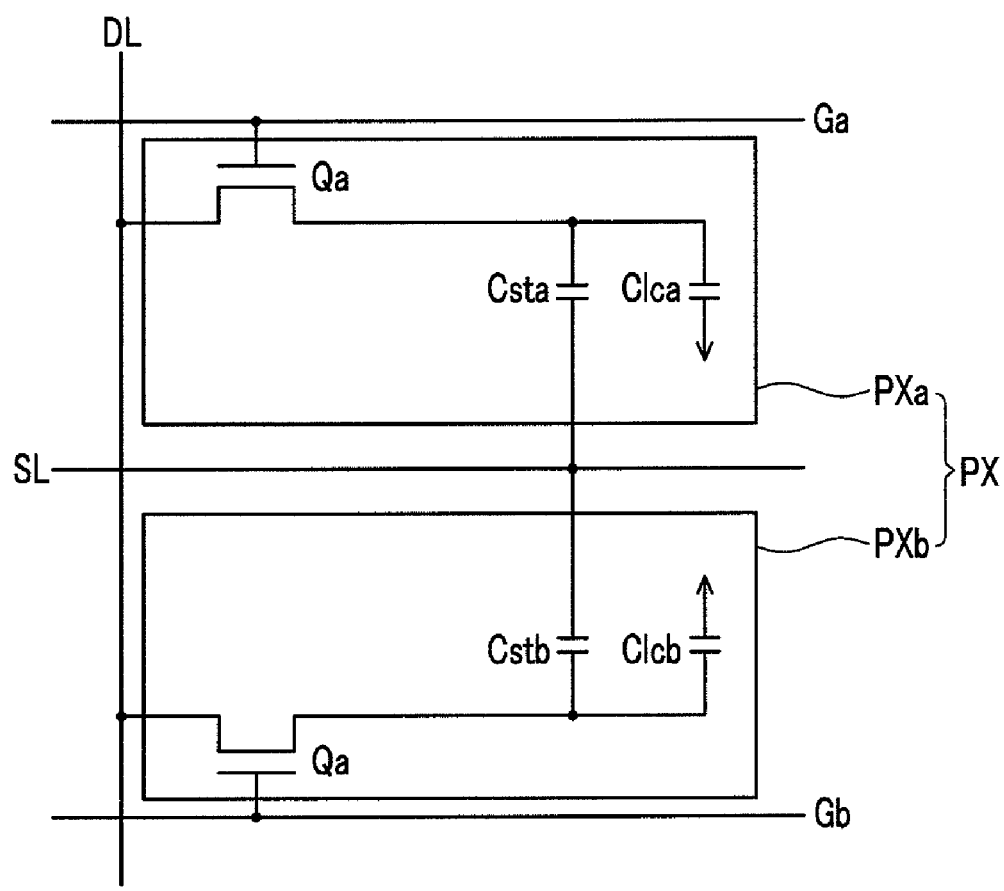
FIG. 15 is a driving circuit of exemplary embodiments shown in FIG. 4 and FIG. 12.

Referring to FIG. 15, an operation of the liquid crystal display according to an exemplary embodiment of the present invention will be described. FIG. 15 is a circuit diagram of the liquid crystal display shown in FIG. 4 and FIG. 12.

In FIG. 15, GLa indicates a first gate line, GLb indicates a second gate line, SL indicates storage wiring, PX indicates a pixel electrode, PXa indicates a first sub-pixel electrode, and PXb indicates a second sub-pixel electrode. Also, Qa indicates a first thin film transistor, Qb indicates a second thin film transistor, Clca indicates a liquid crystal capacitor formed between the first sub-pixel electrode and the common electrode, Csta indicates a storage capacitor formed between the first sub-pixel electrode and the storage wiring, Clcb indicates a liquid crystal capacitor formed between the second sub-pixel electrode and the common electrode, and Cstb indicates a storage capacitor formed between the second sub-pixel electrode and the storage wiring.

Referring to FIG. 12, if the first gate line GLa is applied with a gate-on voltage of for example about 20V, the first thin film transistor Qa is turned on such that a first sub-data voltage is applied to the first sub-pixel electrode PXa, and simultaneously the liquid crystal capacitor Clca and the storage capacitor Csta are charged with the first sub-pixel voltage. The first gate line GLa is applied with a gate-off voltage of for example about −7V, the first thin film transistor Qa is turned-off, and the first sub-pixel voltage charged by the liquid crystal capacitor Clca and the storage capacitor Csta is maintained in the liquid crystal layer between the first sub-pixel electrode PXa and the common electrode during 1 frame. The alignment angle of the liquid crystal molecules of the liquid crystal layer is changed according to the magnitude of the charged first sub-pixel voltage, such that the phase of the transmitted light is changed to thereby change the transmittance of the light passing through the polarizer.

If the second gate line GLb is applied with a gate-on voltage of for example about 20V, the second thin film transistor Qb is turned on such that the second sub-data voltage is applied to the second sub-pixel electrode PXb, and simultaneously the liquid crystal capacitor Clcb and the storage capacitor Cstb are charged with the second sub-pixel voltage. The second gate line GLb is applied with a gate-off voltage of for example about −7V, the second thin film transistor Qb is turned-off, and the second sub-pixel voltage charged by the liquid crystal capacitor Clcb and the storage capacitor Cstb is maintained in the liquid crystal layer between the second sub-pixel electrode PXb and the common electrode during 1 frame. The alignment angle of the liquid crystal molecules of the liquid crystal layer is changed according to the magnitude of the charged second sub-pixel voltage, such that the phase difference of the transmitted light is changed to thereby change the transmittance of the light passing through the polarizer.

In this way, the first sub-pixel electrode PXa and the second sub-pixel electrode PXb forming one pixel electrode PX are driven by the different thin film transistors Qa and Qb, thereby charging the different voltages. For example, the first sub-pixel electrode PXa may be charged with a relatively low voltage, and the second sub-pixel electrode PXb may be charged with a relatively high voltage. Here, the transmittance of the pixel electrode PX may be calculated by the combined value of the transmittance of the liquid crystal layer determined by each of the sub-pixel electrodes PXa and PXb. Accordingly, the gamma curve of one pixel may be represented by a combination of two gamma curves such that distortion of the gamma curve may be substantially prevented and lateral visibility may be improved.

While this invention has been described in connection with what is presently considered to be practical exemplary embodiments, it is to be understood that the invention is not limited to disclosed embodiments, but, on the contrary, is intended to cover various modifications and equivalent arrangements included within the spirit and scope of the appended claims.

What is claimed is:

1. A liquid crystal display comprising:
   a first insulating substrate;
   gate wiring formed on the first insulating substrate;
   data wiring intersecting the gate wiring;
   a thin film transistor connected to the gate wiring and the data wiring;
   a pixel electrode connected to the thin film transistor and including first domain forming members;
   a second insulating substrate facing the first insulating substrate; and
   a common electrode formed on the second insulating substrate and including second domain forming members,
   wherein the first domain forming members and the second domain forming members include oblique portions having a width that gradually increases or decreases along an entire length thereof,
   wherein from a layout view, the first domain forming members and the second domain forming members are alternately disposed, the width of the first domain forming members increasing along a first direction, and the width of the second domain forming members decreasing along the first direction.

2. The liquid crystal display of claim 1, wherein a difference between a maximum width and a minimum width of the first domain forming members is in a range of 2-5 um (micrometer), and a difference between a maximum width and a minimum width of the second domain forming members is in a range of 2-5 um.

3. The liquid crystal display of claim 2, wherein the minimum width of the first domain forming members and the second domain forming members is in the range of 8-10 um, and the maximum width thereof is in the range of 11-13 um.

4. The liquid crystal display of claim 1, further comprising a first black matrix formed on the second insulating substrate, wherein from the layout view the first black matrix overlaps the first domain forming members or the second domain forming members.

5. The liquid crystal display of claim 4, further comprising a second black matrix formed on the second insulating substrate, wherein from the layout view the second black matrix is disposed at a portion corresponding to between two neighboring pixel electrodes.

6. The liquid crystal display of claim 5, wherein the first black matrix is thinner than the second black matrix.

7. The liquid crystal display of claim 1, further comprising a first black matrix formed on the second insulating substrate, wherein from the layout view the first black matrix overlaps the second domain forming members.

8. The liquid crystal display of claim 7, further comprising a second black matrix formed on the second insulating substrate, wherein from the layout view the second black matrix is disposed at a portion corresponding to between two neighboring pixel electrodes.

9. The liquid crystal display of claim 8, wherein the first black matrix is thinner than the second black matrix.

10. The liquid crystal display of claim 1, wherein the oblique portions of the first domain forming members are oblique relative to a centerline of the pixel electrode and the oblique portions of the second domain forming members are oblique relative to a centerline of the common electrode.

11. The liquid crystal display of claim 1, wherein from a layout view, the first domain forming members and the second domain forming members form singular points of liquid crystal molecules disposed between the pixel electrode and the common electrode inside the oblique portions thereof.

12. A liquid crystal display comprising:
    a first insulating substrate;
    gate wiring formed on the first insulating substrate;
    data wiring intersecting the gate wiring;
    a thin film transistor connected to the gate wiring and the data wiring;
    a pixel electrode connected to the thin film transistor and including first domain forming members;
    a second insulating substrate facing the first insulating substrate;
    a black matrix formed on the second insulating substrate;
    an overcoat formed on the black matrix; and
    a common electrode formed on the overcoat and including second domain forming members, wherein the first domain forming members have a width that gradually increases in a first direction along an entire length thereof and the second domain forming members have a width that gradually decreases in the first direction along an entire length thereof, and wherein the black matrix includes a first black matrix disposed at a portion corresponding to the second domain forming members and a second black matrix corresponding to a portion between two neighboring pixel electrodes, and the first black matrix is thinner than the second black matrix.

13. The liquid crystal display of claim 12, wherein the thickness of the first black matrix is about half of the thickness of the second black matrix.

14. The liquid crystal display of claim 12, wherein the black matrix includes an organic insulating layer.

15. A method for manufacturing a liquid crystal display, comprising:
forming gate wiring on a first substrate;
forming data wiring intersecting the gate wiring;
forming a thin film transistor connected to the gate wiring and the data wiring;
forming a pixel electrode connected to the thin film transistor and including first domain forming members having a first oblique portion relative to a centerline of the pixel electrode, the first oblique portion having a width that gradually increases in a first direction along an entire length thereof;
forming a common electrode including second domain forming members having a second oblique portion relative to a centerline of the common electrode, the second oblique portion having a width that gradually decreases in the first direction along an entire length thereof on a second substrate; and
combining the first substrate and the second substrate.

16. The method of claim 15, wherein from a layout view, the first cutouts domain forming members and the second domain forming members are alternately disposed.

17. The method of claim 15, further comprising forming a black matrix including a first black matrix disposed at a portion corresponding to the second domain forming members between the second substrate and the common electrode.

18. The method of claim 17, wherein the black matrix includes a second black matrix disposed at a portion corresponding to a portion between two neighboring pixel electrodes and having a thicker thickness than the first black matrix.

19. The method of claim 18, wherein the black matrix is formed using a halftone mask.

* * * * *